US009131429B1

(12) United States Patent
Bharadwaj et al.

(10) Patent No.: US 9,131,429 B1
(45) Date of Patent: Sep. 8, 2015

(54) TUNE-AWAY BLOCKING DURING A VOLTE CALL ON DSDS MOBILE DEVICE

(71) Applicant: QUALCOMM Incorporated, San Diego, CA (US)

(72) Inventors: Murali Bhaskara Rao Bharadwaj, San Diego, CA (US); Arvind Vardarajan Santhanam, San Diego, CA (US); Kiran Patil, San Diego, CA (US); Ritesh Seth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/320,313

(22) Filed: Jun. 30, 2014

(51) Int. Cl.
*H04M 11/04* (2006.01)
*H04W 48/04* (2009.01)
*H04W 4/22* (2009.01)
*H04W 88/06* (2009.01)

(52) U.S. Cl.
CPC .............. *H04W 48/04* (2013.01); *H04W 4/22* (2013.01); *H04W 88/06* (2013.01)

(58) Field of Classification Search
CPC ........ H04W 48/04; H04W 4/22; H04W 88/06
USPC ....................... 455/404.1, 427, 428
See application file for complete search history.

(56) References Cited

U.S. PATENT DOCUMENTS

| 2004/0246990 | A1* | 12/2004 | Krishnamurthi et al. ..... 370/466 |
| 2008/0270611 | A1* | 10/2008 | Noldus et al. ................. 709/227 |
| 2010/0265914 | A1* | 10/2010 | Song et al. .................... 370/331 |
| 2013/0029629 | A1* | 1/2013 | Lindholm et al. ......... 455/404.1 |
| 2013/0201850 | A1 | 8/2013 | Swaminathan et al. |
| 2013/0215846 | A1 | 8/2013 | Yerrabommanahalli et al. |
| 2013/0303181 | A1 | 11/2013 | Rajurkar et al. |
| 2013/0303240 | A1 | 11/2013 | Sanka et al. |
| 2014/0086209 | A1 | 3/2014 | Su et al. |
| 2015/0016420 | A1* | 1/2015 | Balabhadruni et al. ....... 370/331 |

* cited by examiner

*Primary Examiner* — Shahriar Behnamian
(74) *Attorney, Agent, or Firm* — The Marbury Law Group, PLLC

(57) ABSTRACT

Methods implemented on mobile devices and stored on non-transitory process-readable storage media enable selectively blocking tune-ways to functionalities of a Dual-subscription, Dual-standby (DSDS) mobile device to avoid impairing high-priority calls. An embodiment method implemented in a call manager executing on a processor of the DSDS mobile device may include determining whether a tune-away is blocked based on whether a high-priority call (e.g., VoLTE call) is active on a first functionality, and blocking the tune-away to a second functionality in response to determining that the high-priority call is active on the first functionality. The method may further include allowing the tune-away to the second functionality in response to determining that the high-priority call is not active on the first functionality. In some embodiments, the first functionality may be a packet-switching subscription (e.g., a LTE subscription) and the second functionality may be a circuit-switching subscription (e.g., a GSM subscription).

16 Claims, 11 Drawing Sheets

TUNE-AWAY BLOCKING DURING A VOLTE CALL ON DSDS MOBILE DEVICE

BACKGROUND

Some new designs of mobile devices—such as smart phones, tablet computers, and laptop computers—include two or more radio access technologies ("RATs") that enable the devices to connect to two or more radio access networks, such as Long Term Evolution (LTE) networks and Global System for Mobile Communications (GSM) networks. Such mobile devices may include a single radio-frequency (RF) communication circuit or "RF resource" for providing access to separate networks via two or more RATs, each RAT associated with a network subscription or Subscriber Identity Module (SIM). For example, a first subscription (e.g., a GSM network subscription) may use a transceiver of the mobile device to transmit to a GSM base station at a first time, and may use the transceiver to transmit to an LTE base station via a second subscription (e.g., a LTE SIM) at a second time. Such mobile devices are often referred to as Dual-Subscription, Dual-Standby (DSDS) mobile devices. Conventional DSDS mobile devices may include a call manager module ("CM" in the drawings) or a multi-mode call manager that acts as a central coordinator and organizes all calls associated with various subscriptions, such as by managing call origination and termination. For example, the call manager may generate call IDs for incoming calls (which are referred to as mobile terminating or "MT" calls) or outgoing calls (which are referred to as mobile originating or "MO" calls) on a Universal Mobile Telecommunications System (UMTS)/GSM/Wideband Code Divisional Multiple Access (WCDMA) subscription and/or an LTE subscription. Therefore, the call manager may be aware of the status of various packet-switching (PS) calling. For example, based on information from an IP Multimedia Subsystem or IP Multimedia Core Network Subsystem (IMS) within a mobile device, the call manager may be aware of when a PS call has completed.

As there is only one RF chain for use by subscriptions in a DSDS mobile device, such devices must periodically tune its transceiver to another frequency in a "tune-away" process, momentarily switching from a first subscription to a second subscription in order to receive or monitor communications, such as pages. During such a tune-away, only the second subscription receives communications while the first subscription is temporarily unable to send or receive. The DSDS mobile device is configured to block tune-aways from subscriptions engaged in high-priority circuit-switch (CS) calls, such as voice calls or emergency calls/priority calls on a UMTS/GSM/WCDMA subscription. For example, a non-access stratum layer in a UMTS scenario may cause a lower layer access stratum to block tune-aways from an active CS voice call. The DSDS mobile device is also typically configured to enable tune-aways during packet-switch (PS) data calls without impeding the operations of the PS subscription.

However, subscriptions capable of PS communications may be capable of both voice and data packet exchanges. Accordingly, users of DSDS mobile devices may have suboptimal experiences conducting PS voice calls, such as voice over LTE (VoLTE) calls on an LTE subscription, as tune-aways from a packet-switching subscription to a circuit-switching subscription cause loss of packet data that degrades the experience and quality of the PS voice call.

SUMMARY

Various embodiments provide methods, devices, and non-transitory processor-readable storage media for selectively blocking tune-ways to functionalities of a dual-subscription, dual-standby (DSDS) mobile device to avoid impairing high-priority calls. Methods according to various embodiments may include operations for determining, via a call manager executing on a processor of the DSDS mobile device, whether a tune-away is blocked based on whether a high-priority call is active on a first functionality, and blocking, via the call manager executing on the processor, the tune-away to a second functionality in response to determining that the high-priority call is active on the first functionality.

In some embodiments, the methods may further include allowing, via the call manager executing on the processor, the tune-away to the second functionality in response to determining that the tune-away is not blocked, in which the tune-away is not blocked when the high-priority call is not active on the first functionality.

In some embodiments, allowing the tune-away may include unblocking, via the call manager executing on the processor, the tune-away to the second functionality in response to one of determining that a single radio voice call continuity (SRVCC) has completed successfully, determining that the high-priority call has ended or failed, determining that a T311 timer or an RTP inactivity timer has elapsed, and determining an access class barring condition exists.

In some embodiments, the first functionality may be a packet-switching subscription and the second functionality may be a circuit-switching subscription. In some embodiments, the high-priority call may be a voice over LTE (VoLTE) call. In some embodiments, the high-priority call may be an emergency call.

In some embodiments, the methods may include determining, via the call manager executing on the processor, whether the high-priority call is active on a radio frequency resource shared with the second functionality, and blocking, via the call manager executing on the processor, the tune-away to the second functionality in response to determining that the high-priority call is active on the first functionality and that the high-priority call is active on the radio frequency resource shared with the second functionality.

In some embodiments, the first functionality may be one of a packet-switching subscription and a wireless local area network (WLAN) functionality and the second functionality may be a circuit-switching subscription.

Various embodiments may include a mobile device configured with processor-executable instructions to perform operations of the methods described above. Various embodiments may include a mobile device having means for performing functions of the operations of the methods described above. Various embodiments may include non-transitory processor-readable media on which are stored processor-executable instructions configured to cause a processor of a mobile device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
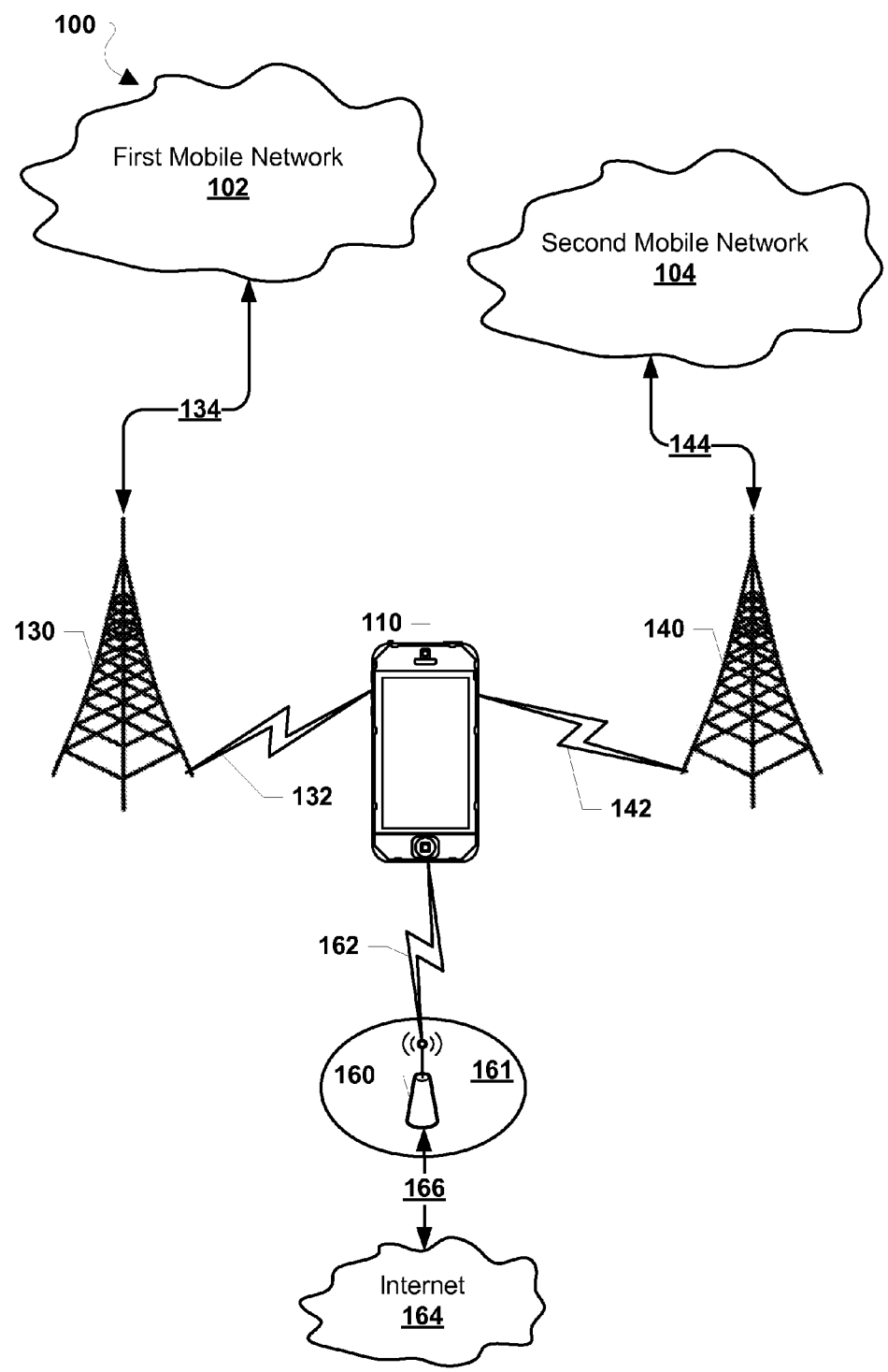
FIG. 1 is a communication system block diagram of a communication network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" or "mobile device" are used herein to refer to any one or all of cellular telephones, smart-phones, web-pads, tablet computers, Internet enabled cellular telephones, WiFi enabled electronic devices, personal data assistants (PDA's), laptop computers, personal computers, and similar electronic computing devices equipped with at least a processor. In various embodiments, such mobile devices may individually maintain a plurality of RATs that may utilize at least one RF resource (i.e., DSDS mobile devices). For example, such mobile devices may be configured with a network transceiver to establish a wide area network (WAN) or local area network (LAN) connection (e.g., an LTE, 3G or 4G wireless wide area network transceiver, a wired connection to the Internet, or WiFi). In some embodiments, mobile devices may include a first RF resource or functionality for cellular network communications (e.g., LTE, GSM, etc.) and a second resource (e.g., Wi-Fi radio, etc.) for wireless local area network (WLAN) communications.

Various embodiments provide methods, devices, systems, and non-transitory process-readable storage media for selectively blocking tune-ways to avoid impairing high-priority calls in a DSDS mobile device. In particular, various embodiments may provide techniques for a DSDS mobile device to prevent (or block) tune-aways to a CS subscription (or functionality) during high-priority calls on a PS subscription (or functionality), such as VoLTE calls on an LTE subscription. By utilizing a call manager (or call manager module) to unify control over tune-aways for both PS and CS calling in a DSDS mobile device, various embodiment techniques streamline tune-away blocking for various scenarios, such as WLAN calling, VoLTE calls, access-barring, emergency calls, etc. For example, when the DSDS mobile device configured with a first subscription (e.g., LTE) and a second subscription (e.g., GSM) is conducting a VoLTE call via the first subscription, the mobile device via its call manager may block any tune-aways to the second subscription until the VoLTE call is completed. In this way, the embodiment techniques provide a centralized, unified approach for managing tune-aways, with the call manager enabling selective tune-away blocking for both CS and/or PS subscriptions to avoid loss of service during voice calls.

In various embodiments, during a high-priority call (e.g., a VoLTE call), tune-aways from a first functionality (e.g., an LTE subscription) to a second functionality (e.g., a GSM subscription) are blocked by the call manager of a DSDS mobile device in order to preserve the integrity of the high-priority call. The call manager of the DSDS mobile device may evaluate current call states against various predefined conditions of the subscriptions. In response to determining the presence of a predefined condition, the call manager may direct tune-aways to be blocked until the condition is no longer present. For example, in response to determining that a high-priority call is active on a PS subscription (e.g., a VoLTE call), the call manager may block regularly scheduled tune-aways for receiving paging on a GSM subscription, causing the GSM subscription to go out-of-service. In some embodiments, in response to changes in the conditions, the call manager may be configured to lower priorities of PS subscriptions and communicate with other layers. For example, the call manager may communicate with an access stratum, such as a radio resource control (RRC)) associated with a UMTS/GSM/WCDMA subscription that facilitates signaling between the DSDS mobile device and a radio access network, to indicate a lowered priority for an LTE subscription and thus that conventional tune-aways are once again allowed.

In some embodiments, the call manager may set a block flag, bit, variable, or other indicator that may be viewed by other software modules or components within the DSDS device (e.g., an RRC). For example, in response to receiving an incoming call on an LTE subscription, the call manager may set a "blocking" variable to indicate tune-aways are currently blocked. However, in response to determining that the incoming call has completed, the call manager may set the "blocking" variable to indicate tune-aways are once again allowed.

Examples of such predefined call states or conditions that may be used by the call manager to determine whether to block or allow tune-aways may include the following. The call manager may allow tune-aways from a PS subscription (e.g., LTE subscription) to a CS subscription (e.g., UMTS/GSM/WCDMA subscription) when the PS subscription is in an IDLE mode camping on the PS subscription (e.g., camping on LTE), and thus there is no active voice call. The call manager may block tune-aways from the PS subscription to the CS subscription when the PS subscription is in a connected mode camping on the PS subscription (e.g., camping on LTE). For example, as soon as the call manager is alerted about an outgoing or incoming call, the call manager may send a call into lower layers (e.g., radio resource control (RRC)) to block tune aways. This enables tune-away blocking to be performed much early in a call setup chain, thereby optimizing the call setup success rate.

When the DSDS is configured with a wireless local area network (WLAN) functionality (e.g., a WiFi radio) separate from the RF chain used by the cellular network subscriptions, the call manager may allow tune-aways on the subscriptions during calls over the WLAN functionality. For example, the call manager may allow tune-aways from an LTE subscription to a GSM subscription during Voice over Internet Protocols (VoIP), Wireless Local Area Network (WLAN), or Interworking Wireless LAN (IWLAN) calls. In other words, the call manager may block tune-aways only in response to determining that an outgoing or incoming call is not on the WLAN modem (i.e., when not camping on a WLAN/IWLAN).

The call manager may unblock tune-aways from the PS subscription to the CS subscription when in a Single Radio Voice Call Continuity (SRVCC) transition has successfully completed or when a PS call fails due to an unsuccessful SRVCC transition. For example, when the DSDS mobile device is in a transition mode from an LTE subscription to a WCDMA/GSM subscription using SRVCC procedures (e.g., handing off a VoLTE call on the LTE to a CS call on the WCDMA/GSM), the call manager may unblock tune-aways in order to complete the handover (e.g., LTE non-access stratum handover procedure).

In order to implement various embodiment techniques, an embodiment call manager of the mobile device may be configured to enable faster decision-making for tune-away blocking during high-priority calls on a PS subscription. For example, the call manager may be configured to control the IP Multimedia Subsystem (IMS) to block or unblock PS calls. In some embodiments, the IP Multimedia Subsystem (IMS) framework for IP multimedia services and the RRC protocols may be configured differently from conventional DSDS devices as well. For example, the RRC may be configured to receive requests from the call manager, but also include arbitration logic within itself that evaluates call states or priorities to determine whether tune-away blocking is enabled. The RRC according to such embodiments may enable the call manager to decide when to block tune-aways based on context in terms of VoLTE calls, but for GSM/WCDMA calls, a non-access stratum may issue the block/unblock commands that go to the RRC. In some embodiments, the RRC may include logic to combine the information from the call manager and the non-access stratum.

In some embodiments, access-barring may prevent subscriptions to gain connectivity or access to their respective networks. For example, data and VoLTE calls may be barred due to an LTE layer issuing accessing barring for all packets. In such scenarios, the call manager may receive call failure notifications for subscriptions, and may be configured to perform unblocking operations (e.g., request non-access stratum to unblock the subscription). As another example, SSAC conditions may prevent the call manager from issuing call ID. In some embodiments, due to access class barring (ACB) conditions existing, the call manager may clean-up issued call IDs on an LTE subscription and initiate a silent redial on a different technology (e.g., a GSM call via a non-access stratum).

In some embodiments, Android logical SIM slots may be configured for use with various implementations of tune-away blocking during high-priority PS calling. For example, a DSDS mobile device that utilizes an Android operating system may have a first virtual slot associated with VoLTE and a second virtual slot associated with GSM that may not be swapped when the VoLTE first virtual slot is in an active VoLTE call, regardless of user inputs to initiate a swap of the VoLTE to be on the second virtual slot.

The following are exemplary scenarios involving a DSDS mobile device configured with a first subscription associated with an LTE communication network and a second subscription associated with a GSM communication network and a call manager configured according to various embodiments. In other words, each of the following scenarios may be addressed by various embodiment techniques to determine whether to block or unblock tune-aways at a given time or operating condition of the DSDS mobile device. When the first subscription is in an idle state and an outgoing call is generated (a "MO" call), the DSDS mobile device may block the tune-away to the second subscription (e.g., the GSM may go out-of-service). When the first subscription is in a connected state and an incoming call is received, the DSDS mobile device may block the tune-away to the second subscription.

When the DSDS mobile device is executing a transfer between the first and second subscriptions via SRVCC procedures and there is a 'pass' result for the transfer (i.e., the hand-off to the second subscription from the first subscription is successful), the DSDS mobile device may cause the call manager to unblock tune-aways for the second subscription, enabling a non-access stratum to issue a new block of tune-aways. In such GSM scenarios, based on the passing transition, the call manager may be configured to indicate that blocking for the LTE subscription is removed, and thus the non-access stratum associated with the GSM may be permitted to handle GSM calls as well as institute blocking for CS calling (i.e., call manager may receive an indication that tune-aways for the LTE may be blocked during CS calling). However, if there is a fail result due to the SRVCC transfer (i.e., the hand-off to the second subscription from the first subscription is not successful), the mobile device may cause the call manager to eventually unblock tune-aways due to a VoLTE call failure as opposed to because of the SRVCC fail. So, in both SRVCC scenarios (pass or fail) described above, tune-away blocking may be disabled by the call manager.

When the DSDS mobile device is in a first access class barring (ACB) scenario, the call manager may block tune-aways from the first subscription to the second subscription due to the ACB being identified prior to transmitting packets of a call (e.g., LTE call packets). For example, once an VoLTE call request (e.g., MO call) has been processed via the call manager and IMS, the DSDS mobile device may identify that a access class bar is present before the call is actually made with a WAN. In other words, the call will eventually fail due to the access class barring condition (i.e., packets are not sent via the LTE network), and the call manager may receive an indication from the IMS or other lower layers that the call has failed, causing the call manager to remove tune-away blocking due to LTE call termination. When the DSDS mobile device is in a second access class barring scenario in which the DSDS mobile device has service specific access barring (SSAC), the call manager may not block tune-aways because the call manager may know the SSAC condition. In other words, the call manager may test for access class barring before allowing a call to be processed, and thus may not issue a call ID and may not allow tune-away blocking due to the SSAC condition. In other words, because of the SSAC, tune-away blocking may not be enabled as the SIMs may remain in their respective idle states.

When a VoLTE call has failed, the mobile device via the call manager may unblock tune-aways and attempt a silent redial via a CS call which in turn may get a tune-away block from the non-access stratum. For example, in response to receiving a VoLTE call request, the call manager module may generate a call ID, enable tune-away blocking, and cause the IMS module to begin processing the call. However, when the IMS module cannot complete the call (e.g., there is no connectivity on the LTE network, etc.), the call manager module may terminate the call (or call ID), remove the tune-away blocking, and cause a silent redial to be performed on the second subscription via a non-access stratum module (e.g., cause a 1×CDMA call). In response to the silent redial call on the second subscription, the RRC module may receive an indication that tune-aways are blocked.

In a scenario in which a network-level "T311" timer has expired due to inactivity and/or another timer running in parallel with the T311 timer expires (e.g., a voice packet timer or a real time protocol (RTP) inactivity timer), a VoLTE call may be terminated, which may cause the call manager to receive a call failure signal that triggers tune-away blocking to be disabled. For example, when there are no packets received/transmitted for a VoLTE call on the first subscription and the T311 timer and/or the RTP inactivity timer expires (or elapses), the call manager may clean-up a call ID and unblock tune-aways due to the VoLTE call being considered terminated. In some embodiments, the call manager may only disable tune-away blocking in response to the expiration of the longer of the T311 timer (e.g., 3 seconds) and the RTP inactivity timer (e.g., 10 seconds, 20 seconds, etc.). However in other embodiments, the call manager may unblock tune-aways in response to the expiration of the shorter timer (e.g., the T311 timer). In some embodiments, such a T311 timer may have a three-second duration, and an RTP inactivity timer may have a 10 or 20-second duration.

In some embodiments, the DSDS mobile device's blocking of tune-aways for a second subscription (e.g., a GSM subscription for a GSM mobile telephony network) may be flexibly controlled via a policy (or policy definition(s)) that is dependent on the context of applications active on a first subscription (e.g., an LTE subscription for an LTE mobile telephony network). Such a policy may include various definitions (or rules) that indicate that if one or more services (e.g., VoLTE, etc.) on the first mobile telephony network (via the first subscription) are active, then the DSDS mobile device may block tune-aways on the second mobile telephony network (via the second subscription) for a maximum blocking duration. For example, the DSDS mobile device may control the maximum blocking time on a GSM subscription based on services active on an LTE subscription and their priorities as indicated in a policy file. In some embodiments, the policy may indicate a paging cycle for waking up on the second subscription (e.g., GSM). Further, the policy may indicate the types of pages on the second mobile telephony network (via the second subscription) that are allowed, such as based on a relative priority. In this way, the policy may allow the DSDS mobile device to continue to receive incoming messages via the second mobile telephony network (via the second subscription) and monitor this network periodically at a defined frequency.

In some embodiments, the DSDS mobile device may be configured with an explicit priority order indicating the services that have higher priority than others and/or a user-specified list of preferences that indicates explicitly the sets of services active on the DSDS mobile device that are more important than others (i.e., user preferences of priority). In some embodiments, the DSDS mobile device may be configured to determine service priorities (i.e., the services that are deemed important by the user) based on history of use of applications. In other words, priorities indicated in the policy (or policy file) may be predetermined, based on user preferences, and/or based on conclusions from learning algorithms performed by the DSDS mobile device.

In some embodiments, based on the services active on the first subscription associated with the first mobile telephony network (e.g., LTE) and the priorities of those active services (e.g., priorities defined in a policy file or based on user preferences or learning algorithms), the DSDS mobile device may control whether to discard or accept incoming messages on the second subscription (e.g., GSM), thus disrupting the first subscription (e.g., LTE) session by connecting on the second mobile telephony network via the second subscription. In other words, pages received on the second mobile telephony network (via the second subscription) may either be processed or locally discarded based on priorities of active sessions on the first mobile telephony network (via the first subscription). For example, if a rich communication services (RCS) Best-Effort Voice call session is active on an LTE subscription, pages on the other GSM subscription may be monitored by the DSDS mobile device at a slightly lower rate than typical. As another example, the DSDS mobile device may evaluate the policy to determine a rich communication services (RCS) message (e.g., RCS instant message (IM)) on the first mobile telephony network may have a higher priority than a "machine-to-machine" type communication on the second mobile telephony network, and thus may not connect to the second network.

In some embodiments, prior to connecting on a second mobile telephony network via a second subscription (e.g., GSM), the DSDS mobile device may be configured to utilize urgent signaling on the first mobile telephony network via the first subscription (e.g., LTE) to a communicating end-point in order to indicate that the DSDS mobile device needs to put a call on hold temporarily due to an expected disruption. In other words, as it is possible that establishing a session on the second subscription and associated mobile telephony network can result in disruption of service on the first subscription and first mobile telephony network, prior to tuning away or switching to the second subscription and responding to the page, the DSDS mobile device may perform a quick notification via the first subscription, indicating to the first mobile telephony network that the DSDS mobile device may be temporarily unavailable. For example, if the disruption is caused due to a short message service (SMS) message, the DSDS mobile device may estimate the typical duration of such a disruption (e.g., a few seconds for SMS-type communications, a longer period for voice calls, etc.) and report to the communicating end-point on the first mobile telephony network apriori before proceeding to connect on the second mobile telephony network via the second subscription (e.g., GSM). To ensure that the second mobile telephony network communication session does not time-out during this urgent signaling on the first subscription, the DSDS mobile device may be configured to enforce a maximum time bound on the first mobile telephony network to complete its procedures (as a "best-effort" attempt). Such urgent signaling to far-end communication end-points to indicate temporary unavailability may allow the far-end communication end-points to adjust accordingly.

Various embodiments may be implemented within a variety of communication systems 100 that include at least two mobile telephony networks, an example of which is illustrated in FIG. 1. A first mobile network 102 and a second mobile network 104 may typically each include a plurality of cellular base stations (e.g., a first base station 130 and a second base station 140). A first mobile device 110 (or DSDS mobile device) may be in communication with the first mobile network 102 through a cellular connection 132 to the first base station 130. The first mobile device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144. The cellular connections 132 and 142 may be made through two-way wireless communication links, such as 4G, 3G, Code division multiple access (CDMA), Time division multiple access (TDMA), WCDMA, GSM, and other mobile telephony communication technologies.

In some embodiments, the first mobile device 110 may be capable of conducting various other wireless connections, such as a wireless connection 162 with a wireless access point 160 (e.g., a Wi-Fi router, etc.), such as over a Wi-Fi connection. The wireless access point 160 may be associated with a local area network 161 (LAN) and further may be configured to connect to the Internet 164 or another network over a wired connection 166.

Figure 2A:
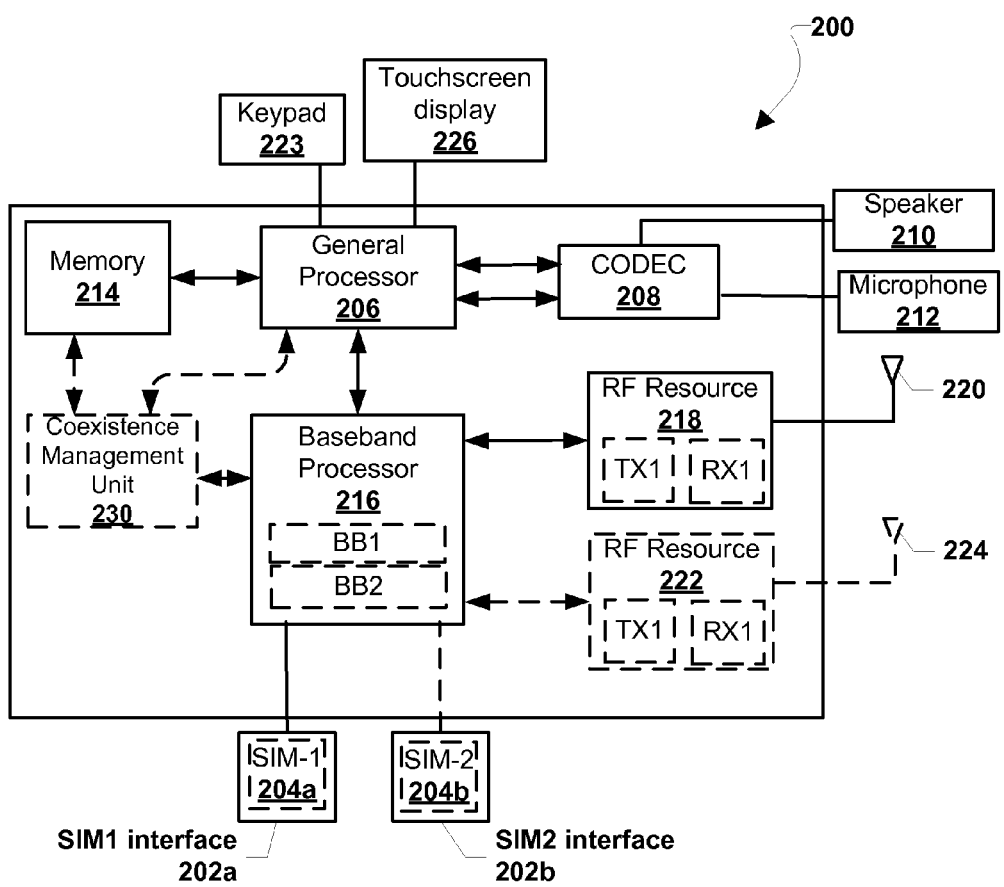
FIG. 2A is a component block diagram of a mobile device suitable for use with various embodiments.

FIG. 2A is a functional block diagram of a mobile device 200 (or DSDS mobile device) suitable for implementing various embodiments. According to various embodiments, the mobile device 200 may be similar to the mobile device 110 as described with reference to FIG. 1. With reference to FIGS. 1-2A, the mobile device 200 may include a first SIM interface 202a, which may receive a first subscriber identity module 204a (referred to as "SIM-1" in FIG. 2A) that is associated with a first subscription. The mobile device 200 may also include a second SIM interface 202b, which may receive a second subscriber identity module 204b (referred to as "SIM-2" in FIG. 2A) that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the mobile device 200 (e.g., memory 214), and thus need not be a separate or removable circuit, chip or card.

The mobile device 200 may include at least one controller, such as a general processor 206 (or applications processor), which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium (or non-transitory processor-readable storage medium) that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. The SIMs in the mobile device 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a RAT, and may include one or more amplifiers and radios, referred to generally herein as RF resources (e.g., RF resources 218).

In some embodiments, the mobile device may include a plurality of baseband-RF resource chains that may share the baseband modem processor 216 (i.e., a single device that performs baseband/modem functions for all SIMs on the mobile device 200). In some embodiments, when the mobile device 200 includes a plurality of baseband-RF resource chains, each RF resource chain may include physically or logically separate baseband processors (e.g., BB1, BB2).

For example, the mobile device 200 may include an optional RF resource 222 coupled to another wireless antenna 224, such as a Wi-Fi transceiver coupled to an antenna. The optional RF resource 222 and associated antenna 224 may or may not be part of a RF chain distinct from the baseband-resource chain described above. For example, the optional RF resource 222 may be coupled to the baseband modem processor 216 or alternatively to a separate modem (not shown). With the optional RF resource 222, the mobile device 200 may be configured to simultaneously conduct communications using the RF resource 218 and the optional RF resource 222 (e.g., maintain an active GSM connection while also conducting a WLAN call).

In some embodiments, the RF resource 218 may be associated with different RATs. For example, a first RAT (e.g., a GSM RAT) and a second RAT (e.g., a CDMA or WCDMA RAT) may be associated with the RF resource 218. The RF resource 218 may each be a transceiver that may perform transmit/receive functions on behalf of various RATs. The RF resource 218 may also include separate transmit and receive circuitry, or may include a transceiver that combines transmitter and receiver functions. The RF resource 218 may be coupled to a wireless antenna 220. The RF resource 218 may also be coupled to the baseband modem processor 216.

In some embodiments, the general processor 206, the memory 214, the baseband processor(s) 216, and the RF resource 218 may be included in the mobile device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile device 200 may include, but are not limited to, a keypad 223, a touch screen display 226, and the microphone 212.

In some embodiments, the keypad 223, the touch screen display 226, the microphone 212, or a combination thereof, may perform the function of receiving a request to initiate an outgoing call. For example, the touch screen display 226 may receive a selection of a contact from a contact list or receive a telephone number. In another example, either or both of the touch screen display 226 and the microphone 212 may perform the function of receiving a request to initiate an outgoing call. For example, the touch screen display 226 may receive a selection of a contact from a contact list or to receive a telephone number. As another example, the request to initiate the outgoing call may be in the form of a voice command received via the microphone 212. Interfaces may be provided between various software modules and functions in the mobile device 200 to enable communication between them, as is known in the art.

Functioning together, the two SIMs 204a, 204b, the baseband modem processor 216, the RF resource 218, and the wireless antenna 220 may constitute two or more RATs. For example, a SIM, baseband processor and RF resource may be configured to support two different RATs, such as GSM and WCDMA. More RATs may be supported on the mobile device 200 by adding more SIM cards, SIM interfaces, RF resources, and/or antennae for connecting to additional mobile networks.

In some embodiments, the mobile device 200 may include a coexistence management unit 230 configured to manage and/or schedule the RATs' utilization of the RF resource 218. In some embodiments, the coexistence management unit 230 may be implemented within the general processor 206. In some embodiments, the coexistence management unit 230 may be implemented as a separate hardware component (i.e., separate from the general processor 206). In some embodiments, the coexistence management unit 230 may be implemented as a software application stored within the memory 214 and executed by the general processor 206. The coexistence management unit 230 may acquire service with a combination of RATs that avoids inter-RAT coexistence interference as described in the disclosure.

Figure 2B:
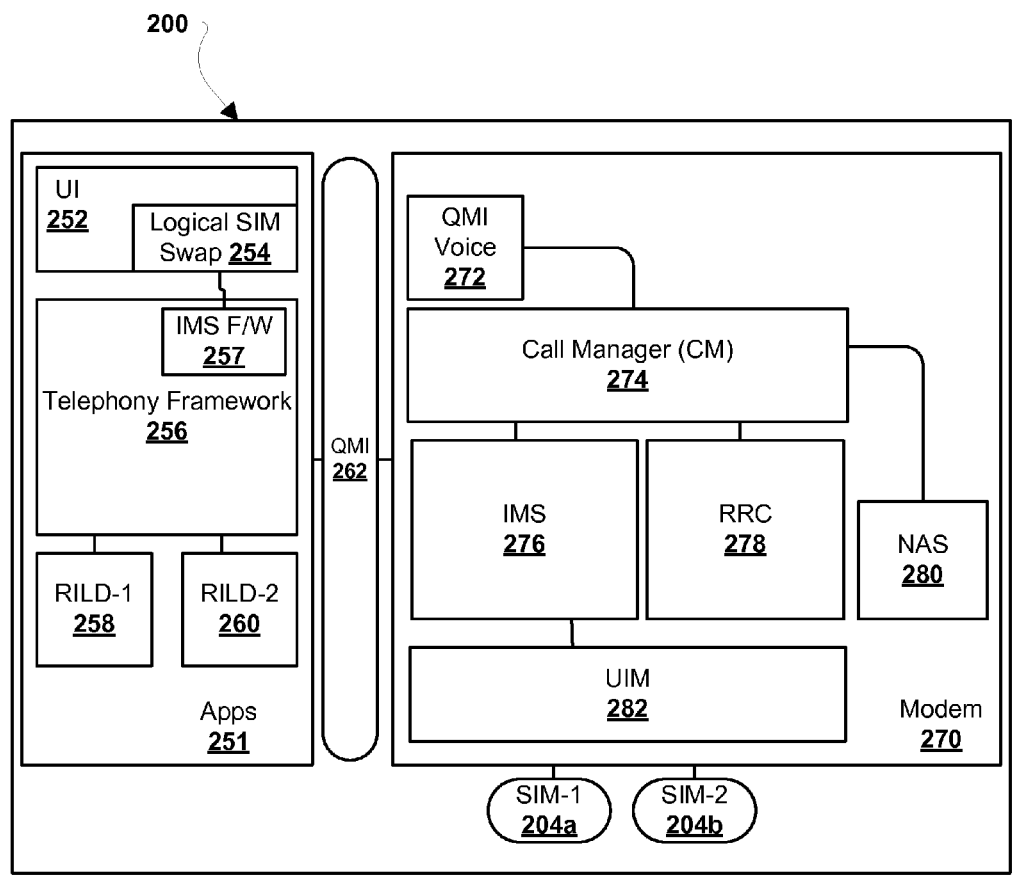
FIG. 2B is a component block diagram of various modules of a mobile device suitable for use with various embodiments.

FIG. 2B illustrates exemplary software modules of a mobile device 200 (or DSDS mobile device) configured to operate in accordance with various embodiments. According to various embodiments, the mobile device 200 may be similar to the mobile device 110 as described with reference to FIGS. 1 and 2A. In some embodiments, the exemplary components may be software modules, routines, applications, threads, and/or other operations executing via one (or more) processors of the mobile device 200.

In general, modules or components 272, 274, 276, 278, 282, 280 may be logically organized within a modem component group 270, such as a group of software modules that may be executed by a modem processor of the mobile device 200. Further, modules or components 252, 254, 256, 258, 260 may be logically organized within an application component group 251, such as a group of software modules that may be executed by an applications processor of the mobile device 200. The modules of the application component group 251 may be associated with a mobile operating system (e.g., Android operating system). A mobile station module interface 262 (referred to as "QMI" in FIG. 2B) may act as a communication bus between various modules of the applications component group 251 and the modem component group 270.

The modem component group 270 may include a mobile station modem (MSM) interface module 272 for voice communications with a mobile station modem (e.g., "QMI" Voice module) that acts as an interface to exchange signals with various modules within the application component group 251, a call manager module 274, an IMS module 276, an RRC module 278 (or LTE RRC module), a non-access stratum (NAS) module 280, a user identity module 282 (UIM), a first SIM 204a (referred to as "SIM-1" in FIG. 2B), and a second SIM 204b (referred to as "SIM-2" in FIG. 2B). The IMS module 276 may communicate with the user identity module 282 to provide credentials. The application component group 271 may include a user interface (UI) module 252 that includes a logical SIM swap module 254, a telephony framework module 256 that includes an IMS framework module 257, a first radio interface daemon 258 (referred to as "RILD-1" in FIG. 2B), and a second radio interface daemon 260 (referred to as "RILD-2" in FIG. 2B).

Referring to the modules of the application component group 251, the telephony framework module 256 may interface with one or more radio interface daemons 258, 260. Each radio interface daemon 258, 260 may be mapped to a particular SIM 204a, 204b. For example, the RILD-1 258 may map to the first SIM 204a (e.g., an LTE SIM) and the RILD-2 260 may map to the second SIM 204b (e.g., a GSM SIM), or vice versa. In some embodiments, the two radio interface daemons 258, 260 may be included in modified Android implementations, although some original equipment manufacturer (OEM) Android implementations may only include one such daemon.

The IMS framework module 257 (or IMS firmware module 257) may be mapped to the telephony framework module 256 for DSDS purposes. The IMS firmware module 257 may be configured to be paired to or belong to one of the radio interface daemons 258, 260, and the rest of the telephony framework 256 may be mapped to the other radio interface daemon 258, 260. For example, if a VoLTE call is being made, the IMS firmware module 257 and the first radio interface daemon 258 may be involved. However, if a regular GSM call is being made, the call may correspond to the telephony framework 256 and the second radio interface daemon 260. The logical SIM Swap module 254 may be in communication with the IMS firmware module 257, and may enable the user to choose the SIM that is mapped to various radio interface daemons 258, 260. Users may utilize the user interface module 252 and logical SIM swap logic to set default SIM for communications or other preferences for calling with the mobile device 200.

The following are illustrative descriptions of how a call may be processed by various modules within a mobile device 200 such as shown in FIG. 2B. Referring to the modules of the modem component group 270, an indication of a call received at the mobile device 200 may be received at the mobile station interface 262, such as from modules of the application component group 251 (e.g., from the Android operating system). The call may be indicated to the call manager module 274, which may evaluate the call type of the call to determine whether the call should be handled by the IMS module 276 or the non-access stratum module 280. For example, a VoLTE call may be handled by the IMS module 276, and a GSM voice call may be handled by the non-access stratum module 280.

If the call is to be handled by the IMS module 276 (e.g., it is a VoLTE call), the call manager module 274 may assign a call identifier (ID) and then issue a call block for the RRC module 278. In other words, the call manager module 274 may block tune-aways to a CS subscription. The RRC module 278 may arbitrate between CS calls and PS calls, such as by deciding whether to block or unblock tune-aways, based on the actions of the call manager module 274 to set tune-away blocking as active or otherwise. In other words, the RRC module 278 may not listen to GSM call pages when the call manager module 274 has set or reported tune-away blocking is activated. At the completion of a VoLTE call (e.g., termination, failure, hang-up, etc.), the IMS module 276 (or alternatively the user interface module 252) may indicate to the call manager module 274 that the call is ended, such as due to loss of connectivity or a user input. In response, the call manager module 274 may remove tune-away blocking and clean-up the associated call ID. When the call is ended, both SIMs 204a, 204b may re-enter a stand-by mode.

In various embodiments, to support selective tune-aways for VoLTE and GSM functionalities, the mobile device 200 may require modifications of the logic for various modules, such as the telephony framework module 256, the mobile station modem (MSM) interface module 272, the call manager module 274, the IMS module 276, and the RRC module 278 (or LTE RRC module). In various embodiments, other components of the mobile device 200 may be similar to those of typical configurations. For example, the user interface (UI) component 252, mobile station interface 262, user identity module (UIM) component 282, SIMs 204a, 204b, and non-access stratum component 280 may not be consistent with original equipment manufacturer (OEM) forms.

Figure 3:
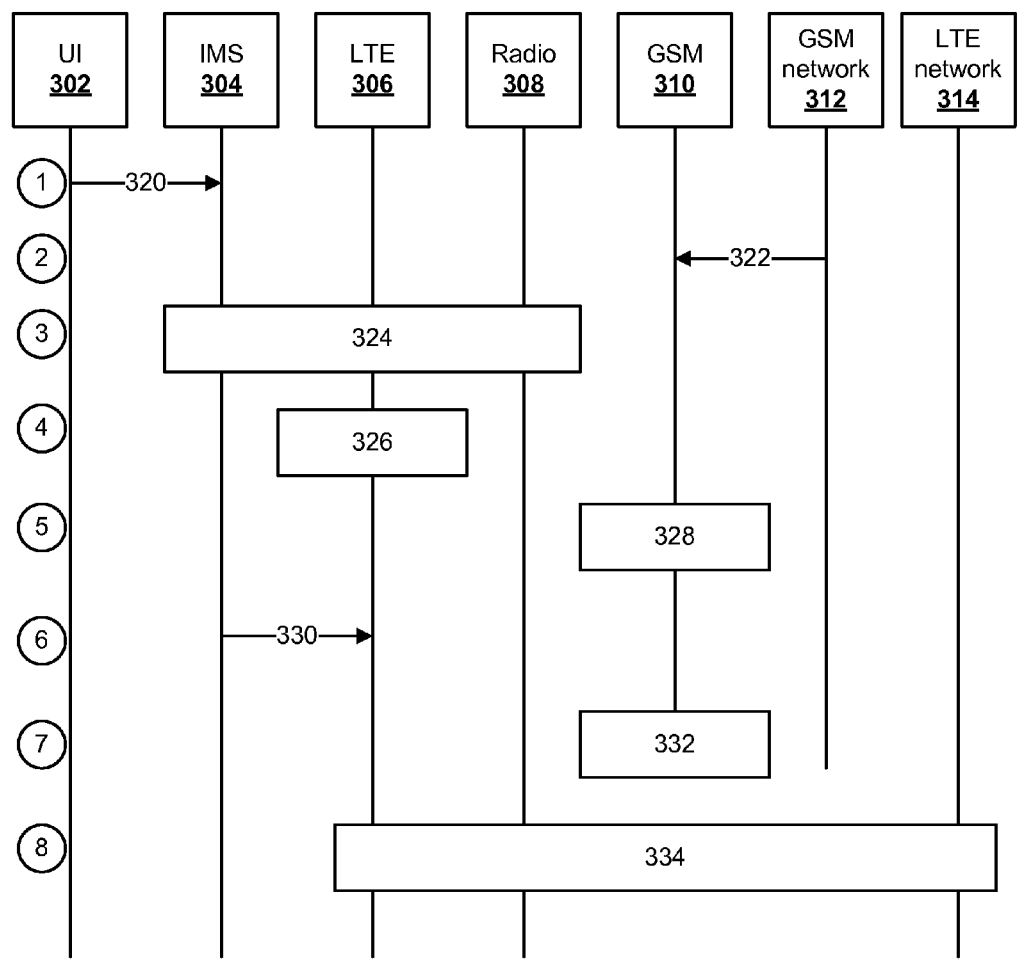
FIGS. 3-4 are call flow diagrams illustrating embodiment operations of a DSDS mobile device configured to utilize a call manager module to selectively handle tune-aways for calls in accordance with various embodiments.
Figure 4:
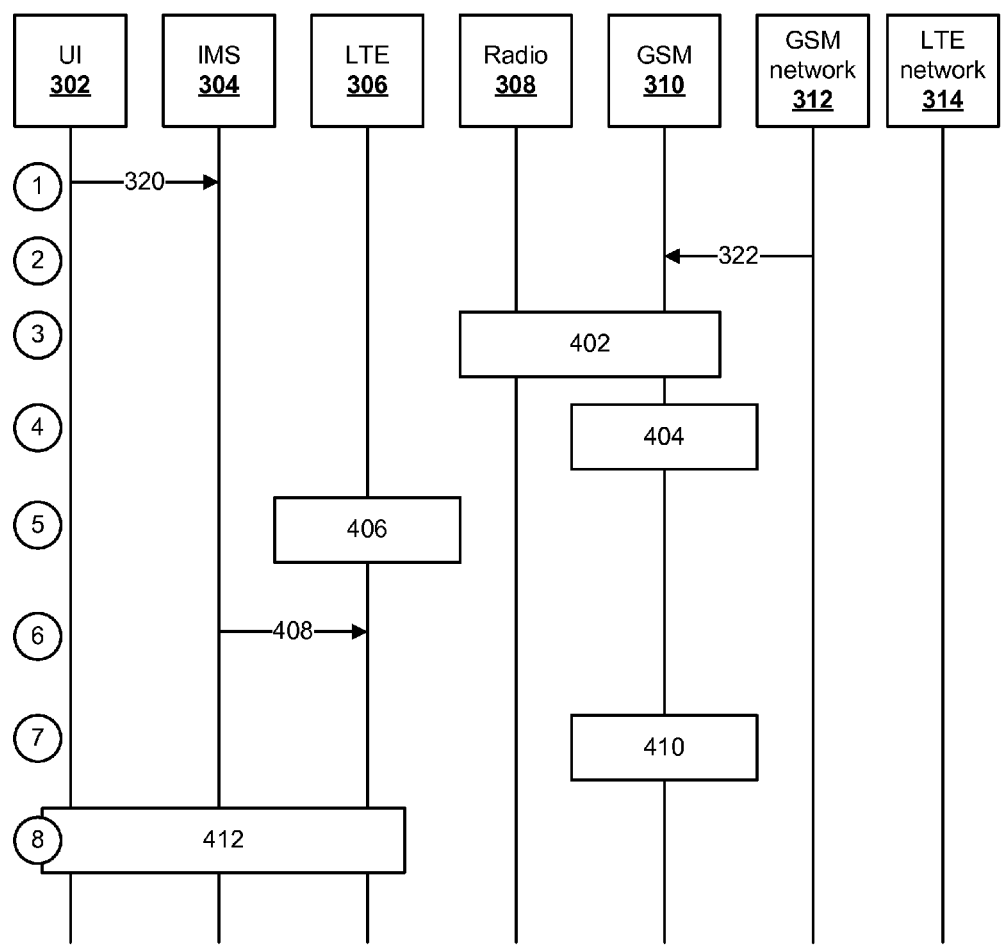

FIGS. 3-4 illustrate embodiment operations and/or states of a DSDS mobile device configured to utilize a call manager module to selectively handle tune-aways for calls in accordance with various embodiments. FIG. 3 may illustrate occurrences over a time period that result in tune-away blocking enabling an improved VoLTE call experience at the DSDS mobile device. At a first time, the UI module 302 may transmit a signal 320 that is received at the call manager (not shown) and communicated to the IMS module 304, indicating a VoLTE call is to be initiated by the DSDS mobile device, such as in response to a user input for an outgoing call. In order for the IMS module 304 to receive the signal 320, the call manager of the DSDS device (not shown) may first process the signal 320. For example, the call manager may identify the call type and/or issue a call ID. At a second time, another signal 322 may be received at a GSM subscription 310 (or SIM) from a GSM network 312 that indicates there is an opportunity for the DSDS mobile device to receive or monitor for a page associated with the GSM network 312. At a third time, in response to the signal 320, the DSDS mobile device via an LTE subscription 306 (or SIM), a radio 308, and the IMS module 304 may perform operations 324 to arbitrate between the LTE subscription 306 and GSM subscription 310. Based on the priority of the VoLTE call associated with the signal 320 (or the order in which the signals 320, 322 arrived at the DSDS mobile device), the radio 308 may be provisioned for the LTE subscription 306 corresponding to the VoLTE call. In various embodiments, VoLTE calls may have a higher priority than GSM calls, and so in a race scenario (or a collision scenario) in which call requests occur within a common time window, the arbitration may award the LTE subscription 306 the use of the radio 308 resources over the GSM subscription 310.

At a fourth time, in response to the provisioning, the LTE subscription 306 may receive the radio 308 for the VoLTE call with operations 326. At a fifth time, the GSM subscription 310 may unsuccessfully attempt to provision the radio 308 with the operations 328 due to the LTE subscription 306 already provisioning the radio 308. In other words, the result of the arbitration of the operations 324 may be that the VoLTE call should receive radio resources over the GSM call. At a sixth time, the IMS module 304 may transmit a signal 330 to the LTE subscription 306 indicating the VoLTE call may commence. At a seventh time, the GSM subscription 310 may be blocked from tuning away to receive a page, and so may miss a page (or experience a page miss) with the operations 332. At an eighth time, the VoLTE call may be conducted with the operations 334 via the LTE subscription 306, radio 308, and LTE network 314. In other words, the VoLTE call may receive the DSDS mobile device resources for conducting the VoLTE call (i.e., the VoLTE call may pass), and thus may conduct the VoLTE call. The operations 334 may not involve the GSM subscription 310 or the GSM network 312, as tune-aways to corresponding to the GSM subscription 310 may be blocked until the VoLTE call has completed.

However, as shown in FIG. 4, the DSDS mobile device may not activate tune-away blocking, allowing either the GSM subscription 310 or the LTE subscription 306 obtain radio resources, such as based on order of request. In particular, at a first time, the UI module 302 may transmit a signal 320 that is received at the call manager (not shown) and then the IMS module 304, indicating a VoLTE call is to be initiated by the DSDS mobile device, such as in response to a user input. At a second time, another signal 322 may be transmitted from a GSM network 312 to a GSM subscription 310 that indicates there is an opportunity for the DSDS mobile device to receive or monitor for a page associated with the GSM network.

Unlike as shown in FIG. 3, at a third time, in response to the signal 322, the DSDS mobile device via the GSM subscription 310 and radio 308, may perform operations 402 to provision the radio 308 for GSM use corresponding to a GSM paging operation indicated by the signal 322. Accordingly, at a fourth time, in response to the provisioning, the GSM subscription 310 may receive the radio 308, and at a fifth time, the LTE subscription 306 may unsuccessfully attempt to provision the radio 308 with the operations 406 due to the GSM subscription 310 already provisioning the radio 308. At a sixth time, the IMS module 304 may transmit a signal 408 to the LTE subscription 306 indicating a VoLTE call has been requested. However, at a seventh time, the GSM subscription 310 may accept an incoming GSM call (e.g., a CS call) via the operations 410. At an eighth time, the DSDS mobile device via the LTE subscription 306, IMS module 304, and UI module 302 may indicate that the VoLTE call is unsuccessful due to the GSM subscription 310 obtaining the radio 308 via the operations 412. In various embodiments, the VoLTE call may fail or otherwise not be chosen to receive the radio 308 due to access class barring or other scenarios described above.

In some embodiments, when there is no collision as a GSM call request is received prior to an LTE call request, the DSDS mobile device may award radio resources to the GSM subscription 310 and block tune-away to the LTE subscription 306.

Figure 5:
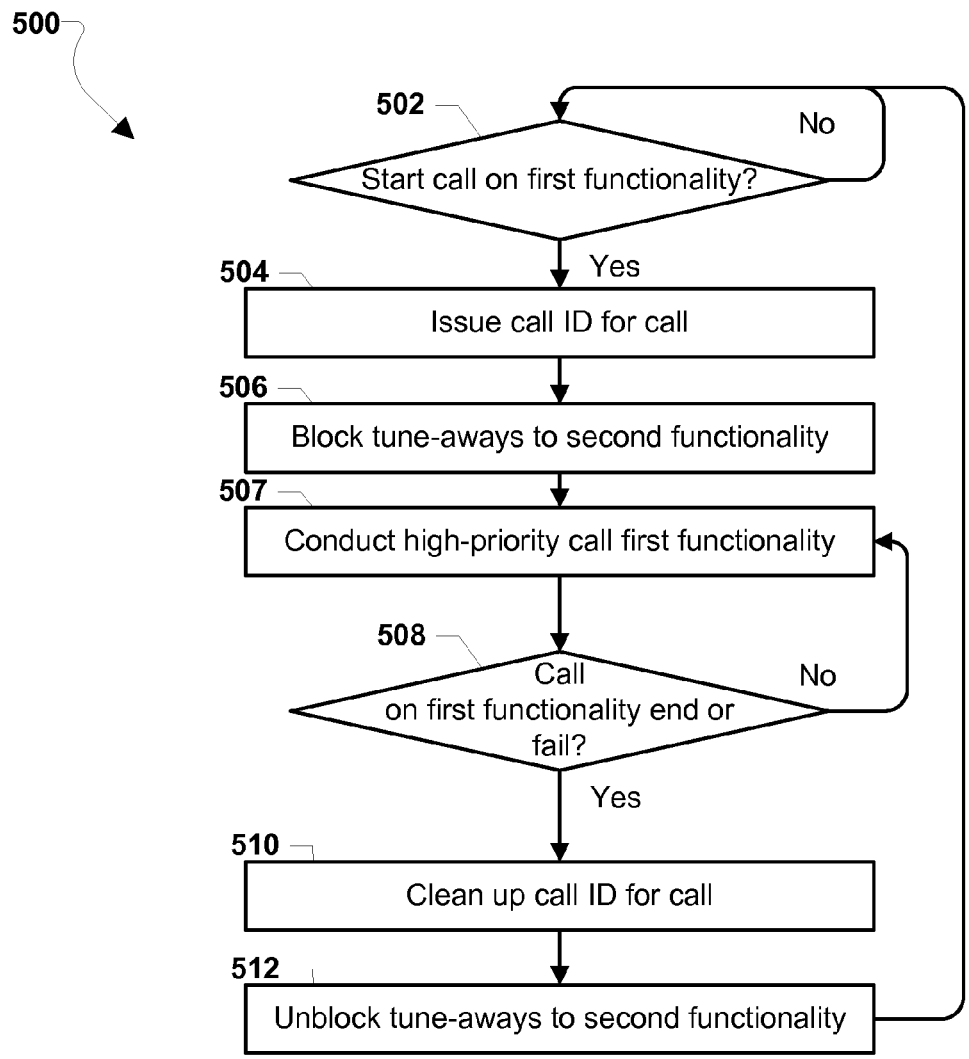
FIGS. 5-9 are process flow diagrams illustrating methods for a DSDS mobile device configured to utilize a call manager module to selectively handle tune-aways during high-priority calls in accordance with various embodiments.

FIG. 5 illustrates a method 500 for a DSDS mobile device to selectively block tune-away via a call manager in order to improve experiences on high-priority calls on a PS subscription according to some embodiments. With reference to FIGS. 1-5, in determination block 502, the processor of the DSDS mobile device may determine whether a call is to be started on a first functionality, such as an LTE subscription. For example, the DSDS mobile device may receive a user input indicating a MO call is being initiated or alternatively may identify that a MT call page has been received. In response to determining that a call is not to be started on the first functionality (i.e., determination block 502="No"), the DSDS mobile device processor may continue determining whether a call is to be started on a first functionality in determination block 502. In response to determining that a call is to be started on the first functionality (i.e., determination block 502="Yes"), the processor of the DSDS mobile device may issue a call identifier (or ID) for the call via the call manager in block 504. Call IDs may indicate the type of call that is being started, such as by indicating whether the starting call is an outgoing or incoming call, includes video data with voice, is related to call waiting, etc. In some embodiments, the call manager may send information indicating that tune-aways are blocked to an RRC, such as priority information of the high-priority call indicating that no tune-aways are allowed.

In block 506, the processor of the DSDS mobile device, via the call manager, may block tune-aways to a second functionality, such as a GSM subscription sharing the same radio resource with the first functionality. Blocking tune-aways (or deactivating tune-aways) may include the call manager setting a variable, bit, flag, or other stored data to indicate the first functionality is involved in a high-priority call (e.g., VoLTE call) that should not be interrupted by tune-aways to the second functionality. As a result of setting such blocking, the second functionality may go out-of-service when it is unable to access its respective network via the shared radio resource.

In block 507, the processor of the DSDS mobile device may conduct the high-priority call on the first functionality. For example, the DSDS mobile device may engage in a PS call on an LTE subscription, such as by requesting that the IMS module initiate the call transmission. In determination block 508, the processor of the DSDS mobile device, via the call manager, may determine whether the high-priority call on the first functionality has ended, failed, or is otherwise to be terminated. For example, the call manager may receive information from an IMS module that indicates that the call was ended, or alternatively may receive information indicating that a user input has been received that ends the call (e.g., a hang-up or "End" button has been pressed.). As another example, the processor may determine that the call has ended when a T311 timer or RTP inactivity timer has expired as described. In response to determining that the high-priority call on the first functionality has not ended or failed (i.e., determination block 508="No"), the DSDS mobile device may continue to conduct the high-priority call in block 507.

In response to determining that the high-priority call on the first functionality has ended or failed (i.e., determination block 508="Yes"), the processor of the DSDS mobile device, via the call manager, may clean up the call ID for the ended call in block 510, and in block 512 may unblock tune-aways (or disable blocking) to the second functionality, such as by resetting a flag or bit to deactivate the blocking. The DSDS mobile device may continue determining whether a call is to be started on a first functionality in determination block 502. In some embodiments, when the processor determines that the high-priority call has failed (i.e., determination block 508="Yes"), the call manager may perform the operations in blocks 510-512 and then perform a silent redial as described.

Figure 6:
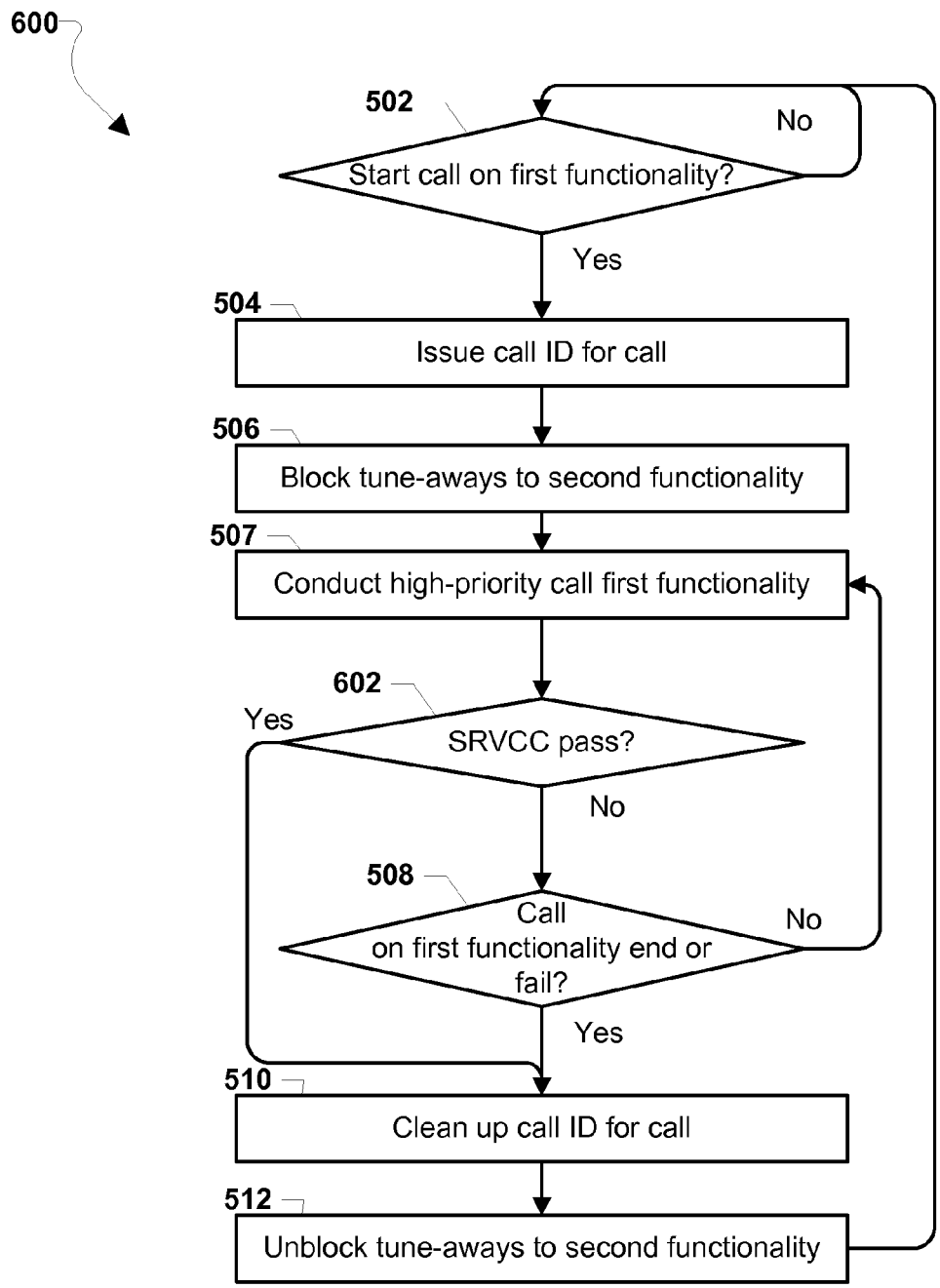

FIG. 6 illustrates another method 600 for a DSDS mobile device to avoid tuning-away during a high-priority call on a PS subscription according to some embodiments. The method 600 is similar to the method 500 described with reference to FIG. 5, except the method 600 may include operations for unblocking tune-aways with respect to SRVCC transitions, such as transitioning from an LTE subscription to a GSM subscription.

As described, when the DSDS mobile device is executing a transfer between the first and second subscriptions via SRVCC procedures and there is a 'pass' result for the transfer (i.e., the hand-off to the second subscription from the first subscription is successful), the DSDS mobile device may cause the call manager to unblock tune-aways for the second subscription, enabling a non-access stratum to issue a new block of tune-aways. When the transition is successful, PS calling may be disabled during CS calling. However, if there is a fail result of the SRVCC transfer, tune-away blocking may still be removed by the call manager as a result of a failed LTE call.

With reference to FIGS. 1-6, the operations in blocks 502-512 may be as described with reference to FIG. 5. When the high-priority call is being conducted (i.e., tune-aways to the second functionality are blocked and there is an issued call ID for the high priority call), the processor of the DSDS mobile device may determine whether a SRVCC transition has been successfully performed (i.e., passed) in determination block 602. The DSDS mobile device may determine that the SRVCC has occurred (or is occurring), as well as the results of such a SRVCC transition, at a given time based on stored data available to the call manager, such as a transition variable, etc. In response to determining that the DSDS mobile device has not passed its SRVCC transition or that there has been no SRVCC transition at all (i.e., determination block 602="No"), the DSDS mobile device may continue with the operations in determination block 508 as described with reference to FIG. 5. In other words, if the SRVCC transition was failed, the call manager may eventually perform the operations for cleaning up the high-priority call and unblocking tune-aways in blocks 510-512 when the call is determined to have terminated or otherwise ended.

In response to determining that the DSDS mobile device has passed its SRVCC transition or that there has been no SRVCC transition at all (i.e., determination block 602="Yes"), the DSDS mobile device may directly perform the operations for cleaning up the high-priority call and unblocking tune-aways in blocks 510-512.

Figure 7:
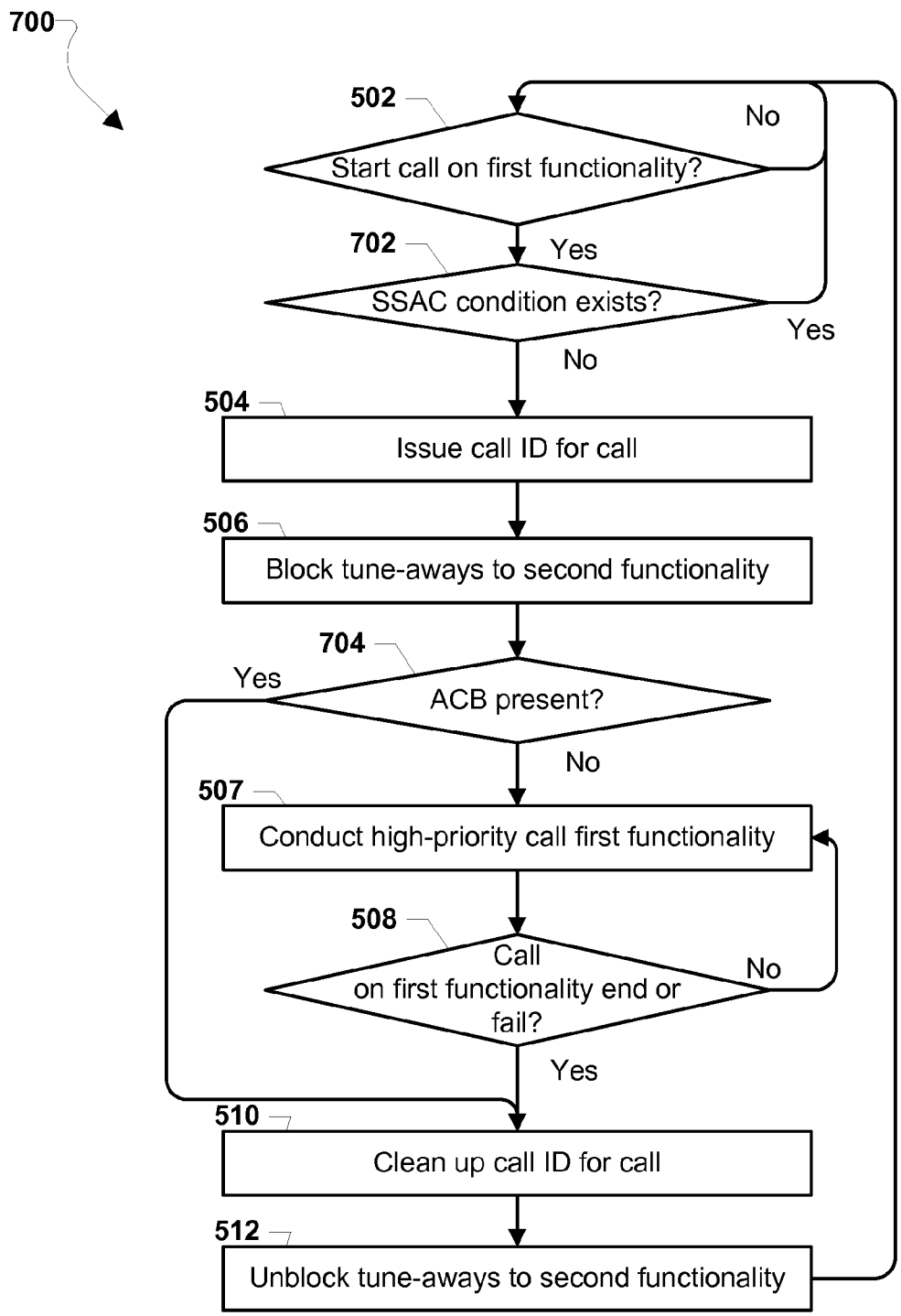

FIG. 7 illustrates another method 700 for a DSDS mobile device to avoid tuning-away during a high-priority call on a PS subscription according to some embodiments. The method 700 is similar to the method 500 described with reference to FIG. 5, except the method 700 may include operations for unblocking tune-aways with respect to access class barring. As described, the call manager may block tune-aways from the first subscription to the second subscription based on access barring conditions known to the call manager and/or as reported by lower layers, such as the IMS prior to call packets being distributed via a network.

With reference to FIGS. 1-7, the operations in blocks 502-512 may be as described with reference to FIG. 5. In response to determining that a call is to be started on the first functionality (i.e., determination block 502="Yes"), the processor of the DSDS mobile device, via the call manager, may determine whether a service specific access barring (SSAC) condition exists with respect to the high-priority call that is to be started in determination block 702, such as by the call manager may evaluate stored indicators of SSAC conditions. For example, the call manager may perform a check to determine whether a SSAC check fails (e.g., no SSAC condition exists) or passes (e.g., a SSAC condition exists). In response to determining that a SSAC condition exists (i.e., determination block 702="Yes"), the DSDS mobile device may continue with the operations in determination block 502 and wait for another high priority call to start, as the current high-priority call may not be initiated based on the SSAC condition. In some embodiments, when the SSAC condition exists, the call manager may start a backoff timer and repeat the performance of the operations in determination block 702.

In response to determining that a SSAC condition does not exists (i.e., determination block 702="No"), the processor of the DSDS mobile device, via the call manager, may continue with the operations in blocks 504-506 for issuing a call ID and blocking tune-aways to the second functionality. In determination block 704, the processor of the DSDS mobile device, via the call manager, may determine whether an access class barring (ACB) condition is present. This determination may be made based on information returned to the call manager from the IMS module, such as indications that packets were not transmitted due to the access barring being identified at a lower layer. In response to determining that the ACB condition is not present (i.e., determination block 704="No"), the DSDS mobile device may continue with the operations in block 507 for conducting the high-priority call as described above. In response to determining that the access class barring condition is present (i.e., determination block 704="Yes"), the DSDS mobile device via the call manager may continue with the operations for cleaning up the call ID and unblocking tune-aways with the operations in blocks 510-512.

Figure 8:
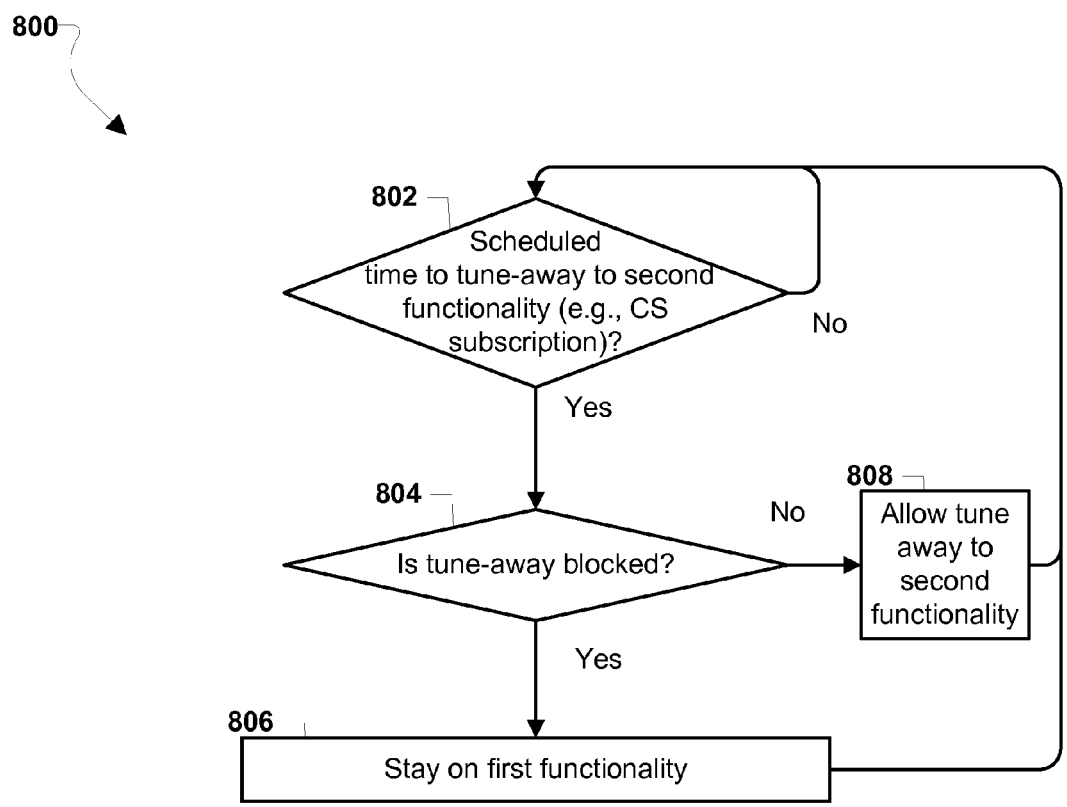

FIG. 8 illustrates a method 800 for a DSDS mobile device configured to utilize a call manager module to selectively handle tune-aways from a first functionality (e.g., an LTE subscription) to a second functionality (e.g., a GSM subscription) during high-priority calls according to some embodiments. For example, the DSDS mobile device via its call manager may refuse a request to monitor page requests on a GSM subscription when an LTE subscription is engaged in a VoLTE voice call or an emergency call on the LTE subscription.

With reference to FIGS. 1-8, in determination block 802, the processor of the DSDS mobile device may determine whether it is a scheduled time to perform a tune-away to the second functionality (e.g., GSM subscription). In particular, the DSDS mobile device may determine based on a pre-defined tune-away paging cycle whether a CS subscription (e.g., GSM subscription) is supposed to utilize a shared RF chain to check or receive a page or otherwise conduct a CS call. In response to determining it is not a scheduled time to tune-away to the second functionality (i.e., determination block 802="No"), the DSDS mobile device may continue with the evaluation operations in determination block 802.

In response to determining it is a scheduled time to tune-away to the second functionality (i.e., determination block 802="Yes"), the processor of the DSDS mobile device, via the call manager, may determine whether the tune-away to the second functionality is blocked in determination block 804. In other words, DSDS mobile device may determine whether the DSDS mobile device is engaged in a high-priority call on a first functionality. For example, the DSDS mobile device may determine whether the call manager has set information (e.g., a flag, variable, etc.) indicating there is an active VoLTE call or an emergency call. In other embodiments, the DSDS mobile device may evaluate current operations regarding the first functionality to identify whether tune-away blocking should be enabled at a given time, such as based on whether VoLTE call data is actively being received or whether there is a VoLTE call ID issued by the call manager. In some embodiments, the call manager may transmit information indicating an increased priority of a VoLTE call to enable tune-away blocking to the second subscription.

In response to determining that the tune-away to the second functionality is blocked (i.e., determination block 804="Yes"), the processor of the DSDS mobile device may stay on the first functionality in order to continue an uninterrupted high priority call. In other words, the second functionality may remain in an out-of-service condition until the first functionality is no longer being used for a high priority call and the tune-away blocking is disabled by the call manager. The DSDS mobile device may then continue with the operations in determination block 802. In response to determining that the tune-away to the second functionality is not blocked (i.e., determination block 804="No"), the processor of the DSDS mobile device, via the call manager, may allow (or enable) tune-aways to the second functionality in block 808. For example, the call manager may remove a block or otherwise change a tune-away blocking indicator (e.g., flag, bit, etc.) in order to deactivate tune-away blocking and allow the second functionality to receive and/or monitor for pages, etc. The DSDS mobile device may then continue with the operations in determination block 802.

Figure 9:
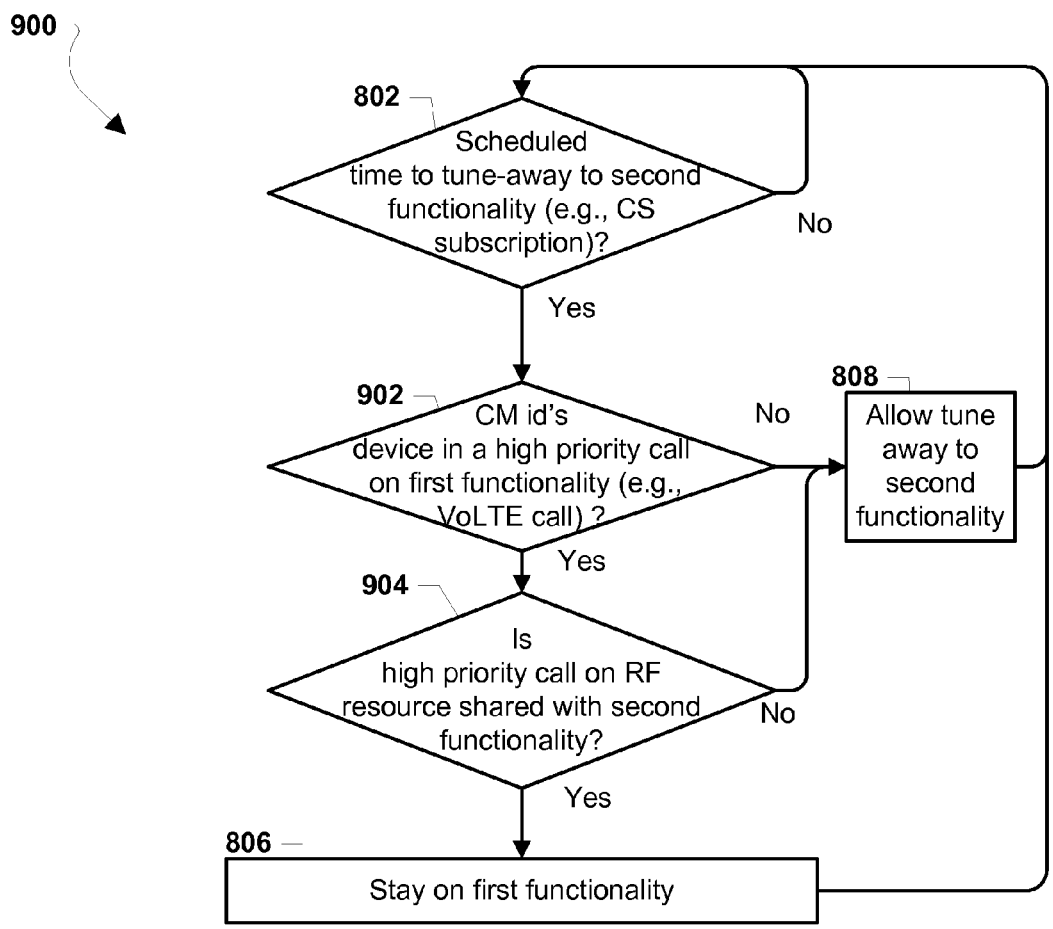

FIG. 9 illustrates another method 900 for a DSDS mobile device to avoid tuning-away during a high-priority call on a PS subscription according to some embodiments. The method 900 is similar to the method 800 described with reference to FIG. 8, except the method 900 may include operations enabling tune-aways during WLAN/IWLAN calling that are not on the PS subscription. For example, when the DSDS mobile device is configured to conduct VOIP calls using a Wi-Fi modem, tuning-away to a CS subscription on the shared RF chain may be allowed, as no PS subscription call may be affected.

With reference to FIGS. 1-9, the operations in blocks 802-808 may be as described with reference to FIG. 8. In response to determining it is a scheduled time to tune-away to the second functionality (i.e., determination block 802="Yes"), the processor of the DSDS mobile device may determine whether the call manager has identified the DSDS mobile device to be engaged in a high-priority call on a first functionality in determination block 902. The operations in determination block 902 may be similar to those of determination block 804 described with reference to FIG. 8, except determination block 902 may explicitly determine whether there is an active high-priority call as opposed to merely identifying whether there is an active tune-away block. For example, the DSDS mobile device may determine whether the call manager has information indicating there is an active VoLTE call.

In response to determining that the call manager has identified that the DSDS mobile device is not engaged in a high-priority call on the first functionality (i.e., determination block 902="No"), the processor of the DSDS mobile device, via the call manager, may allow tune away to the second functionality in block 808 and continue with the operations in determination block 802. In response to determining that the call manager has identified the DSDS mobile device to be engaged in a high-priority call on the first functionality (i.e., determination block 902="Yes"), the processor of the DSDS mobile may determine whether the high-priority call is being conducted on a radio frequency resource (RF resource) shared with second functionality in determination block 904. In other words, the DSDS mobile device may determine whether the high priority call necessarily precludes the tune-away to the second functionality. For example, when the first functionality is an LTE SIM, the DSDS mobile device may not tune-away in order to avoid impairing the experience of the high priority call (i.e., go out-of-service on the LTE subscription). But, as the DSDS mobile device may include other resources, such as a WiFi radio, tune-away during a high-priority call may not impact the call. For example, when the high priority call is a WiFi call via WLAN, the DSDS mobile device may still safely tune-away to a GSM subscription without causing loss in the WIFI call.

Accordingly, in response to determining that the high-priority call is not being conducted on the shared RF resource (i.e., determination block 904="No"), the DSDS mobile device may continue with the operations for allowing tune-away in block 808 as described above. However, in response to determining that the high-priority call is being conducted on the shared RF resource (i.e., determination block 904="Yes"), the DSDS mobile device may continue with the operations for blocking tune-away and staying on the first functionality in block 806 as described above, and may then continue with the operations in determination block 802.

Figure 10:
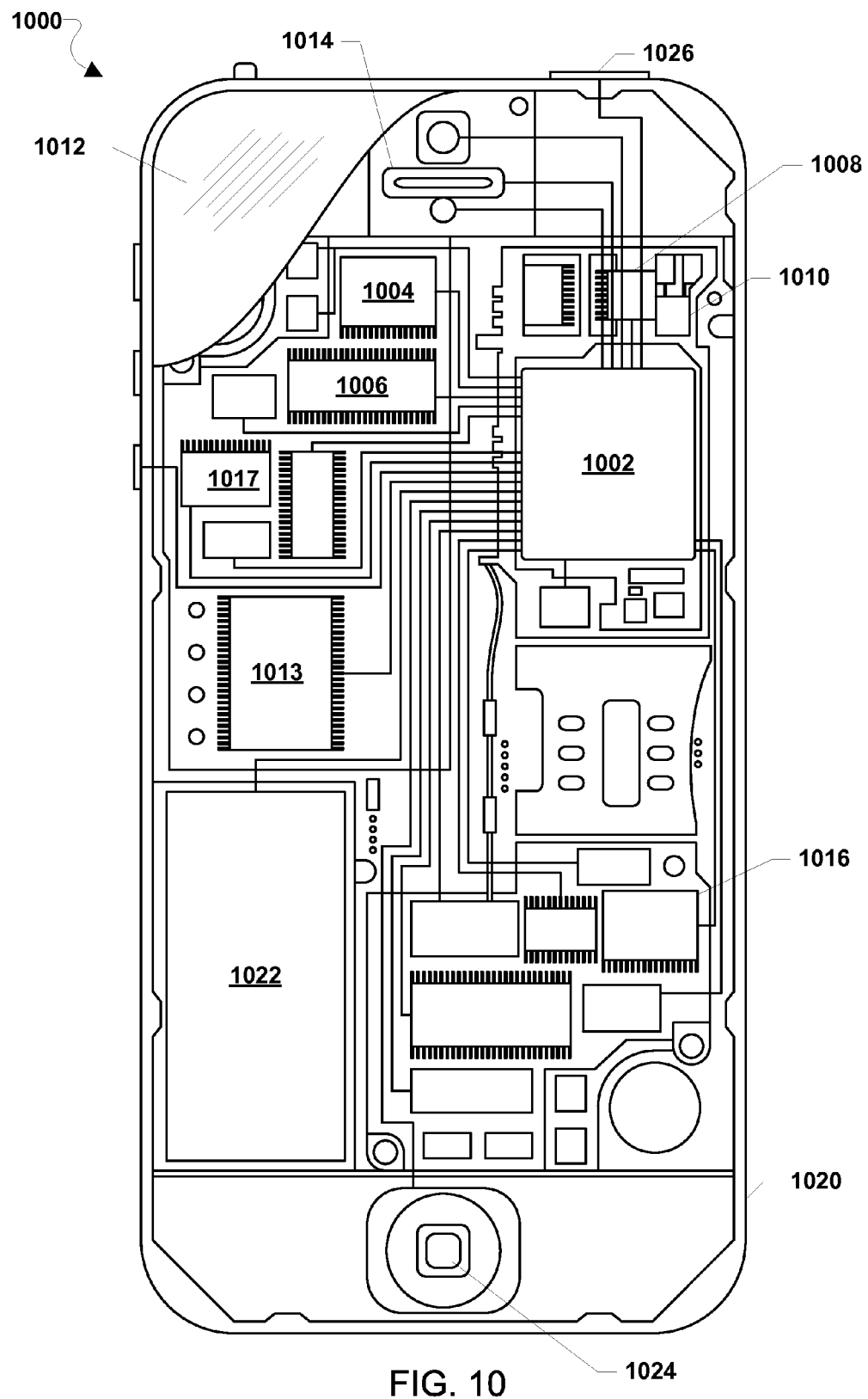
FIG. 10 is a component block diagram of a mobile device suitable for use with various embodiments.

Various embodiments may be implemented in any of a variety of mobile devices, an example on which (e.g., mobile device 1000) is illustrated in FIG. 10. According to various embodiments, the mobile device 1000 may be similar to the mobile devices 110, 200 as described above with reference to FIGS. 1, 2A, 2B. As such, the mobile device 1000 may be capable of implementing the methods 500, 600, 700, 800, 900 in FIGS. 5-9.

Thus, with reference to FIGS. 1-9, the mobile device 1000 may include a processor 1002 coupled to a touch screen controller 1004 and an internal memory 1006. The processor 1002 may be one or more multi-core integrated circuits designated for general or specific processing tasks. The internal memory 1006 may be volatile or non-volatile memory, and may also be secure and/or encrypted memory, or unsecure and/or unencrypted memory, or any combination thereof. The touch screen controller 1004 and the processor 1002 may also be coupled to a touch screen panel 1012, such as a resistive-sensing touch screen, capacitive-sensing touch screen, infrared sensing touch screen, etc. Additionally, the display of the mobile device 1000 need not have touch screen capability.

The mobile device 1000 may have a cellular network transceiver 1008 coupled to the processor 1002 and an antennae 1010 and configured for sending and receiving cellular communications. The transceiver 1008 and the antennae 1010 may be used with the above-mentioned circuitry to implement various embodiment methods. The mobile device 1000 may include one or more SIM cards (e.g., SIM 1013) coupled to the transceiver 1008 and/or the processor 1002 and configured as described above. The mobile device 1000 may include a cellular network wireless modem chip 1017 that enables communication via a cellular network and is coupled to the processor 1002. In some embodiments, the mobile device 1000 may include a Wi-Fi radio 1016 (or transceiver) coupled to the processor 1002 that enables communications via a Wi-Fi connection.

The mobile device 1000 may also include speakers 1014 for providing audio outputs. The mobile device 1000 may also include a housing 1020, constructed of a plastic, metal, or a combination of materials, for containing all or some of the components discussed herein. The mobile device 1000 may include a power source 1022 coupled to the processor 1002, such as a disposable or rechargeable battery. The rechargeable battery may also be coupled to the peripheral device connection port to receive a charging current from a source external to the mobile device 1000. The mobile device 1000 may also include a physical button 1024 for receiving user inputs. The mobile device 1000 may also include a power button 1026 for turning the mobile device 1000 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for selectively blocking tune-ways to functionalities of a mobile device to avoid impairing high-priority calls, comprising:

determining, via a call manager executing on a processor of the mobile device, whether a tune-away is blocked based on whether a high-priority call is active on a first functionality that is one of a packet-switching subscription and a wireless local area network (WLAN) functionality;

determining, via the call manager executing on the processor, whether the high-priority call is active on a radio frequency resource shared with a second functionality that is a circuit-switching subscription; and blocking, via the call manager executing on the processor, the tune-away to the second functionality in response to determining that the high-priority call is active on the first functionality and that the high-priority call is active on the radio frequency resource shared with the second functionality.

2. The method of claim 1, further comprising allowing, via the call manager executing on the processor, the tune-away to the second functionality in response to determining that the tune-away is not blocked, wherein the tune-away is not blocked when the high-priority call is not active on the first functionality.

3. The method of claim 2, wherein allowing the tune-away comprises unblocking, via the call manager executing on the processor, the tune-away to the second functionality in response to one of:
    determining that a single radio voice call continuity (SRVCC) has completed successfully;
    determining that the high-priority call has ended or failed;
    determining that a T311 timer or an RTP inactivity timer has elapsed; and
    determining an access class barring condition exists.

4. The method of claim 1, wherein the high-priority call is a voice over LTE (VoLTE) call.

5. The method of claim 1, wherein the high-priority call is an emergency call.

6. A mobile device, comprising a processor configured with processor-executable instructions to:
    determine whether a tune-away is blocked based on whether a high-priority call is active on a first functionality of the mobile device that is one of a packet-switching subscription and a wireless local area network (WLAN) functionality;
    determine whether the high-priority call is active on a radio frequency resource shared with a second functionality that is a circuit-switching subscription; and
    block the tune-away to the second functionality in response to determining that the high-priority call is active on the first functionality and that the high-priority call is active on the radio frequency resource shared with the second functionality.

7. The mobile device of claim 6, wherein the processor is configured to allow the tune-away to the second functionality in response to determining that the tune-away is not blocked, wherein the tune-away is not blocked when the high-priority call is not active on the first functionality.

8. The mobile device of claim 7, wherein the processor is further configured to unblock the tune-away to the second functionality in response to one of:
    determining that a single radio voice call continuity (SRVCC) has completed successfully;
    determining that the high-priority call has ended or failed;
    determining that a T311 timer or an RTP inactivity timer has elapsed; and
    determining an access class barring condition exists.

9. The mobile device of claim 6, wherein the high-priority call is a voice over LTE (VoLTE) call.

10. The mobile device of claim 6, wherein the high-priority call is an emergency call.

11. A non-transitory processor-readable storage medium having stored thereon processor-executable instructions configured to cause a processor of a mobile device to perform operations comprising:
    determining whether a tune-away is blocked based on whether a high-priority call is active on a first functionality of the mobile device that is one of a packet-switching subscription and a wireless local area network (WLAN) functionality;
    determining whether the high-priority call is active on a radio frequency resource shared with a second functionality that is a circuit-switching subscription; and
    blocking the tune-away to the second functionality in response to determining that the high-priority call is active on the first functionality and that the high-priority call is active on the radio frequency resource shared with the second functionality.

12. The non-transitory processor-readable storage medium of claim 11, wherein the stored processor-executable instructions are configured to cause the processor of the mobile device to perform operations further comprising allowing the tune-away to the second functionality in response to determining that the tune-away is not blocked, wherein the tune-away is not blocked when the high-priority call is not active on the first functionality.

13. The non-transitory processor-readable storage medium of claim 12, wherein the stored processor-executable instructions are configured to cause the processor of the mobile device to perform operations for allowing the tune-away, the operations comprising unblocking the tune-away to the second functionality in response to one of:
    determining that a single radio voice call continuity (SRVCC) has completed successfully;
    determining that the high-priority call has ended or failed;
    determining that a T311 timer or an RTP inactivity timer has elapsed; and
    determining an access class barring condition exists.

14. The non-transitory processor-readable storage medium of claim 11, wherein the high-priority call is a voice over LTE (VoLTE) call.

15. The non-transitory processor-readable storage medium of claim 11, wherein the high-priority call is an emergency call.

16. A mobile device, comprising:
    means for determining whether a tune-away is blocked based on whether a high-priority call is active on a first functionality of the mobile device that is one of a packet-switching subscription and a wireless local area network (WLAN) functionality;
    determining whether the high-priority call is active on a radio frequency resource shared with a second functionality that is a circuit-switching subscription; and
    means for blocking the tune-away to the second functionality of the mobile device in response to determining that the high-priority call is active on the first functionality of the mobile device and that the high-priority call is active on the radio frequency resource shared with the second functionality.

* * * * *

UNITED STATES PATENT AND TRADEMARK OFFICE
CERTIFICATE OF CORRECTION

| | | |
|---|---|---|
| PATENT NO. | : 9,131,429 B1 | Page 1 of 1 |
| APPLICATION NO. | : 14/320313 | |
| DATED | : September 8, 2015 | |
| INVENTOR(S) | : Bharadwaj et al. | |

It is certified that error appears in the above-identified patent and that said Letters Patent is hereby corrected as shown below:

Claims

Column 20, line 52, claim 1: "tune-ways" to read as --tune-aways--

Signed and Sealed this
Nineteenth Day of January, 2016

Michelle K. Lee
*Director of the United States Patent and Trademark Office*